US012370562B2

(12) United States Patent
Vanzetto et al.

(10) Patent No.: US 12,370,562 B2
(45) Date of Patent: Jul. 29, 2025

(54) TURBINE, FLUID-SPRAYING DEVICE, ASSOCIATED FACILITY AND MANUFACTURING METHOD

(71) Applicant: EXEL INDUSTRIES, Epernay (FR)

(72) Inventors: Denis Vanzetto, Meylan (FR); Sylvain Perinet, Meylan (FR)

(73) Assignee: EXEL INDUSTRIES, Epernay (FR)

( * ) Notice: Subject to any disclaimer, the term of this patent is extended or adjusted under 35 U.S.C. 154(b) by 1021 days.

(21) Appl. No.: 17/259,539

(22) PCT Filed: Jul. 12, 2019

(86) PCT No.: PCT/EP2019/068795

§ 371 (c)(1),
(2) Date: Jan. 11, 2021

(87) PCT Pub. No.: WO2020/011965

PCT Pub. Date: Jan. 16, 2020

(65) Prior Publication Data

US 2021/0162435 A1 Jun. 3, 2021

(30) Foreign Application Priority Data

Jul. 13, 2018 (FR) ...................................... 1856519

(51) Int. Cl.
*B05B 5/04* (2006.01)
*B05B 3/02* (2006.01)
(Continued)

(52) U.S. Cl.
CPC .............. *B05B 5/0415* (2013.01); *B05B 3/02* (2013.01); *B05B 3/10* (2013.01); *B05B 3/1035* (2013.01);
(Continued)

(58) Field of Classification Search
CPC .......................... B05B 5/0415; B05B 13/0431
(Continued)

(56) References Cited

U.S. PATENT DOCUMENTS 9,375,734 B1 * 6/2016 van der Steur ....... B05B 3/1035
2015/0217306 A1 * 8/2015 Matsumoto ........... B05B 3/1092 118/323

FOREIGN PATENT DOCUMENTS

EP 2808089 A1 12/2014
EP 3031532 A1 6/2016
(Continued)

OTHER PUBLICATIONS

INPI Rapport de Recherche Préliminaire for Patent Application No. FR 1856519, May 9, 2019, 2 pp.
(Continued)

*Primary Examiner* — Jason J Boeckmann
(74) *Attorney, Agent, or Firm* — Soquel Group LLC

(57) ABSTRACT

A turbine for a fluid-spraying device including a turbine body, and a rotor rotating a bowl relative to the body about an axis, the rotor being surrounded by the turbine body in a plane perpendicular to the common axis, the turbine body guiding the rotation of the rotor, the rotor being rotated by a stream of gas, the turbine body receiving the stream of gas at the outlet of the rotor, and delimiting at least one outlet duct configured to guide a first portion of the received stream into a space delimited in a plane perpendicular to the common axis by the bowl and a skirt.

16 Claims, 8 Drawing Sheets

(51) Int. Cl.
*B05B 3/10* (2006.01)
*B05B 13/04* (2006.01)

(52) U.S. Cl.
CPC .......... *B05B 5/0403* (2013.01); *B05B 5/0426* (2013.01); *B05B 13/0431* (2013.01)

(58) Field of Classification Search
USPC ............... 239/222.11, 214.13, 237, 263, 223
See application file for complete search history.

(56) References Cited

FOREIGN PATENT DOCUMENTS

| | | | |
|---|---|---|---|
| FR | 2906162 | A1 | 3/2008 |
| WO | 2013111427 | A1 | 8/2013 |
| WO | 2015004966 | A1 | 1/2015 |

OTHER PUBLICATIONS

PCT International Search Report for Patent Application No. PCT/EP2019/068795, Oct. 23, 2019, 2 pp.

* cited by examiner

TURBINE, FLUID-SPRAYING DEVICE, ASSOCIATED FACILITY AND MANUFACTURING METHOD

CROSS-REFERENCE TO RELATED APPLICATIONS

This application claims benefit under 35 USC § 371 of PCT Application No. PCT/EP2019/068795 entitled TURBINE, FLUID-SPRAYING DEVICE, ASSOCIATED FACILITY AND MANUFACTURING METHOD, filed on Jul. 12, 2019 by inventor Denis Vanzetto. PCT Application No. PCT/EP2019/068795 claims priority of French Patent Application No. 18 56519, filed on Jul. 13, 2018.

FIELD OF THE INVENTION

The present invention relates to a turbine and a fluid-spraying device. The present invention also relates to a fluid-spraying facility and a method for manufacturing such a facility.

BACKGROUND OF THE INVENTION

Fluid-spraying facilities comprising a spraying device mounted on a moving arm are used in many applications. These spraying devices frequently comprise a rotating bowl driven in rotation by a turbine, an injector for injecting the fluid into the bottom of the bowl and a skirt for generating jets of air for conformation of the sprayed stream of fluid.

These various elements are mounted at one end of the moving arm, for example by screwing. In particular, one end of the injector is received in a cavity of the arm, opposite intake ducts for the fluid to be sprayed. The turbine is fastened to the arm around the injector opposite air intake ducts for driving the turbine. The skirt surrounds the turbine and is in turn fastened to the arm opposite conformation air intake ducts. The bowl is fastened to the end of the rotor of the turbine, the bowl being surrounded by the skirt.

However, the various parts which make up the fluid-spraying device have complex geometries, and are therefore difficult to position relative to one another. In particular, the relative positioning of the skirt and of the bowl is difficult to master, since the bowl is mounted at one end of the injector while the skirt and injector are positioned relative to one another by their fastening, at the other end, to the arm. Small variations in positioning at the arm may therefore cause a substantial variation in relative positioning of the bowl and of the skirt.

However, any deviation in positioning of these parts relative to one another may result in imperfect conformation of the sprayed fluid stream, in particular if the rotating bowl and the skirt are incorrectly positioned. Further, such a fluid-spraying device is frequently disassembled and reassembled, whether to replace worn parts, to modify the characteristics of the device or because the ducts are clogged. The conformation of the sprayed fluid may therefore be subject to frequent significant variation during the use of the device, based on various disassembly and reassembly operations thereof.

There is therefore a need for a turbine making it possible to obtain a fluid-spraying device in which the conformation of the sprayed fluid is better controlled.

SUMMARY OF THE INVENTION

To this end, proposed is a turbine for a fluid-spraying device comprising a turbine body and a rotor configured to rotate a bowl relative to the body about a common axis of rotation, the rotor being surrounded by the turbine body in a plane perpendicular to the common axis, the turbine body being configured to guide the rotation of the rotor, the rotor being configured to be rotated by a stream of gas, the turbine body being configured to receive the stream of gas at the outlet of the rotor and delimiting at least one outlet duct configured to guide a first portion of the received stream into a space delimited in a plane perpendicular to the common axis by the bowl and the skirt.

Also proposed is a turbine for a fluid-spraying device comprising a turbine body and a rotor configured to rotate a bowl relative to the body about a common axis of rotation, the rotor being surrounded by the turbine body in a plane perpendicular to the common axis, the turbine body being configured to guide the rotation of the rotor, the turbine body being configured to guide the rotation of the rotor, the turbine body being adapted so that the injector and the skirt are mounted directly on the turbine body, the bowl being mounted directly on the rotor.

According to advantageous but optional embodiments, the turbine comprises one or more of the following features, considered alone or according to any technically possible combination(s):

- the turbine body includes a first end face and a second end face, the two end faces delimiting the body of the turbine along the common axis, the ratio between the gas stream flow rate passing through the second end face and the gas stream flow rate of the first portion of the stream being less than 1/100.
- the turbine at least partially delimits an auxiliary passage able to conduct a second portion of the stream of gas from the rotor to the bottom of the bowl.
- the turbine body is arranged so that during operation, the ratio between the flow rate of the first portion of the stream of gas and the second portion of the stream of gas is greater than or equal to 2, preferably greater than or equal to 3 and preferably greater than or equal to 10.
- the turbine body has a first end face delimiting the turbine body along the common axis, the skirt bearing against the first end face, each outlet duct extending between two ends, the turbine body delimiting each of the outlet ducts from one of their ends to the other end, each outlet duct opening onto the first end face.
- the turbine body includes a second end face delimiting the turbine body along the common axis, the injector being received in an opening arranged in the second end face, the opening having a first bearing face perpendicular to the common axis, the injector including a second bearing face, the second bearing face bearing against the first bearing face.

Also proposed is a fluid-spraying device, comprising a bowl, a turbine, the rotor being surrounded by the turbine body in a plane perpendicular to the common axis, the turbine body being configured to guide the rotation of the rotor, an injector configured to inject the fluid into the bottom of the bowl, and a skirt at least partially surrounding the bowl in a plane perpendicular to the common axis and configured to eject jets of gas in order to mold the sprayed fluid.

According to advantageous but optional embodiments, the fluid-spraying device comprises one or more of the following features, considered alone or according to any technically possible combination(s):

- an upstream direction and a downstream direction are defined for the common axis, the skirt being offset toward the downstream direction relative to the turbine body, the rotor having a first upstream face delimiting the rotor along the common axis, the turbine body delimiting a receiving chamber of the rotor, the chamber including a second upstream face delimiting the chamber along the common axis, the second upstream face facing the first upstream face and being offset along the upstream direction relative to the first upstream face, an annular groove centered on the common axis being arranged in the second upstream face, the annular groove being configured to receive the stream of gas and to transmit the first portion of the stream of gas to each outlet duct.

the second upstream face includes, for each outlet duct, a radial groove extending radially outward from the annular groove and configured to guide the first portion of the stream of gas from the annular groove to the outlet duct.

two outlet ducts, the radial grooves each extending from the annular groove along a rectilinear specific line, the two specific lines being combined.

an auxiliary passage able to conduct a second portion of the stream of gas from the rotor to the bottom of the bowl, at least one section of the auxiliary passage being arranged in the turbine body.

the injector is surrounded by the rotor in a plane perpendicular to the common axis, a free volume separating the rotor and the injector in a plane perpendicular to the common axis, the auxiliary passage comprising a duct configured to guide the second portion of the stream of gas to the free volume, the free volume being able to guide the second portion of the stream of gas to the bottom of the bowl.

Also proposed is an installation assembly, including a moving arm and a fluid-spraying device in which the turbine body is mounted directly on the arm.

The disclosure also describes a turbine for a fluid-spraying device, the turbine comprising a body and a rotor which is configured to rotatable about an axis, called common axis of rotation, the rotor being surrounded by the turbine body in a plane perpendicular to the common axis, the turbine further including a tube having an outer face and an inner face, the tube being mounted coaxially to the turbine body and intended to be mounted coaxially to the skirt, a first section of the tube being surrounded by the turbine body, a second section of the tube being intended to be surrounded by the skirt, the second section being offset along the downstream direction relative to the first section, the tube being rotatable about the common axis relative to the turbine body, the turbine body being configured to prevent a translation of the tube parallel to the common axis relative to the turbine body, the second section having, on the outer face, a first thread intended to engage a second thread arranged on the skirt in order to press the skirt against the turbine body.

According to one embodiment, the turbine body has a shape suitable for allowing air to be conveyed toward a skirt.

Also proposed is a fluid-spraying device, comprising a bowl, a turbine as previously described, an injector configured to inject the fluid into the bottom of the bowl, and a skirt at least partially surrounding the bowl in a plane perpendicular to the common axis and configured to eject jets of gas in order to mold the sprayed fluid.

According to advantageous but optional embodiments, the fluid-spraying device comprises one or more of the following features, considered alone or according to any technically possible combination(s):

the outer face includes a shoulder perpendicular to the common axis, the turbine body including a bearing face bearing against the shoulder in order to prevent a translation along the downstream direction of the tube relative to the turbine body.

the first section is delimited along the common axis by the shoulder and has a length, measured along the common axis, greater than or equal to 5 millimeters.

the turbine body includes at least a first part and a second part which are fastened to one another, the second part being offset along the downstream direction relative to the first part, the tube being at least partially accommodated in a groove delimited along a direction parallel to the common axis by the first part and the second part, the second part bearing against the tube in order to prevent a translation of the tube along the downstream direction relative to the first part.

the inner face of the second section has, at least at one point, a normal direction, an angle being defined between the normal direction and a segment connecting this point to the common axis, the angle being measured in a plane perpendicular to the common axis and being strictly greater than 5 degrees.

a plurality of notches are arranged in the inner face of the second section.

each notch extends along a direction parallel to the common axis.

the tube has an end face delimiting the tube along the common axis, the end face facing the downstream direction, each notch opening onto the end face.

each notch has a bottom, a distance measured in a plane perpendicular to the common axis between the bottom and the common axis being defined for each notch, the skirt including an inner face having a symmetry of revolution about the common axis, a minimum diameter being defined for the inner face of the skirt, the distance from each notch being less than or equal to half of the minimum diameter of the skirt.

each notch has a cross-section in a plane perpendicular to the common axis, the cross-section of each notch being an arc of circle.

Also proposed is an assembly comprising a device and a tool configured to engage the inner face of the second section so as to transmit a force to the tube which tends to pivot the tube about the common axis relative to the turbine body.

There is therefore a need for a fluid-spraying device in which the conformation of the sprayed fluid is better controlled.

Also proposed is a facility including a moving arm and a fluid-spraying device as defined above, in which each of the rotor, the injector and the skirt is mounted on the arm by means of the turbine body.

Also proposed is a method for manufacturing a facility comprising a moving arm and a fluid-spraying device including a bowl, a turbine comprising a turbine body and a rotor configured to rotate the bowl relative to the body about a common axis of rotation, the rotor being surrounded by the turbine body in a plane perpendicular to the common axis, the turbine body being configured to guide the rotation of the rotor, an injector configured to inject the fluid into the bottom of the bowl, and a skirt surrounding the bowl at least partially in a plane perpendicular to the common axis and configured to eject jets of gas adapted to mold the sprayed fluid. The method includes steps for a) assembling the rotor, the injector and the skirt directly on the turbine body, b) assembling the bowl directly on the rotor, and c) assembling the turbine body directly on the arm, step c) being implemented after step a).

BRIEF DESCRIPTION OF THE DRAWINGS

Features and advantages of the invention will appear more clearly in light of the following disclosure, provided solely as a non-limiting example, and done in reference to the appended drawings, in which.

DETAILED DESCRIPTION OF EMBODIMENTS

Figure 1:
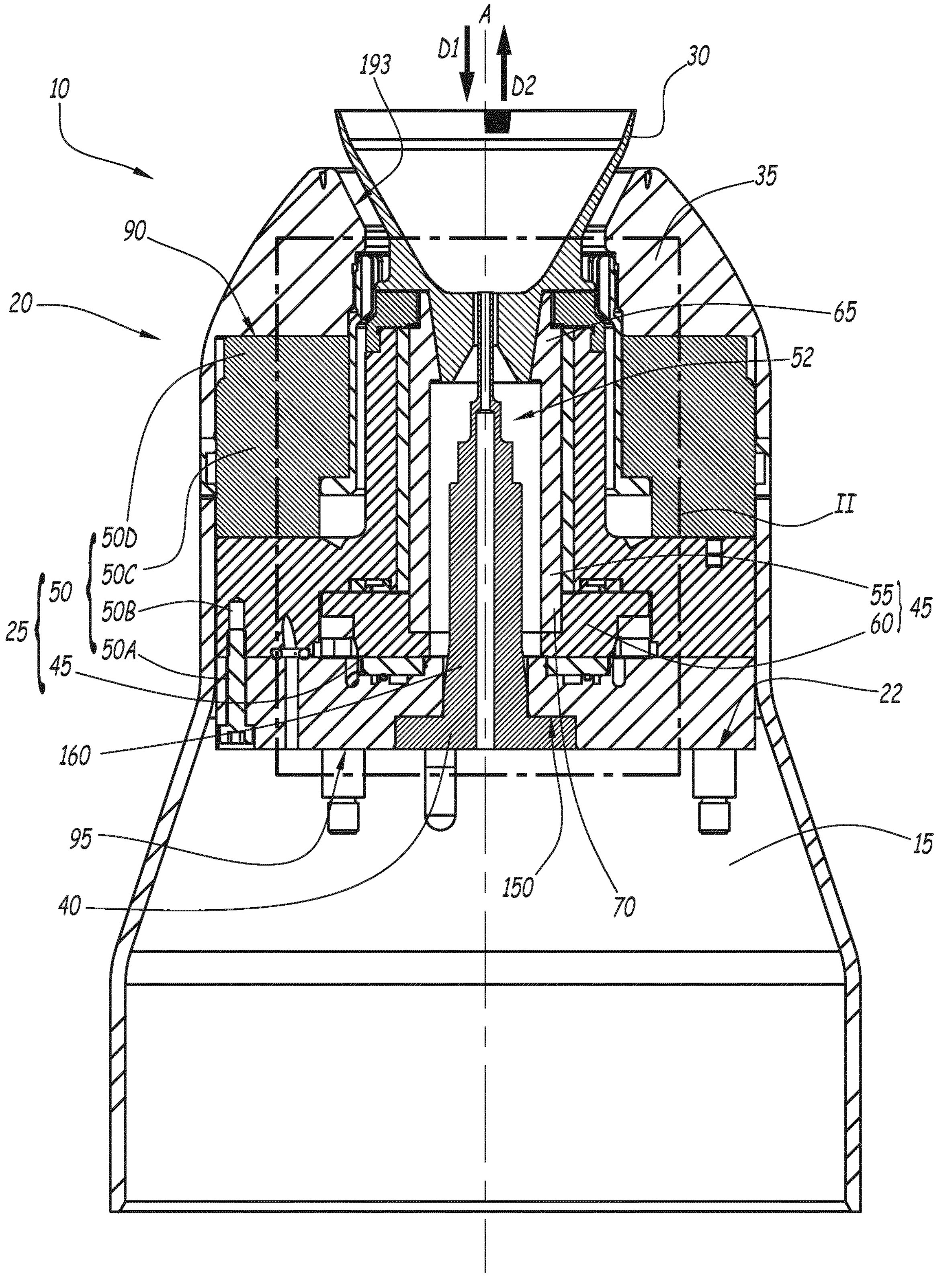
FIG. 1 is a cross-sectional view of a fluid-spraying device according to the invention, this device comprising a threaded tube and a turbine body comprising a flange.

A fluid-spraying facility 10 is partially shown in FIG. 1.

The facility 10 is configured to spray a fluid F.

Figure 3:
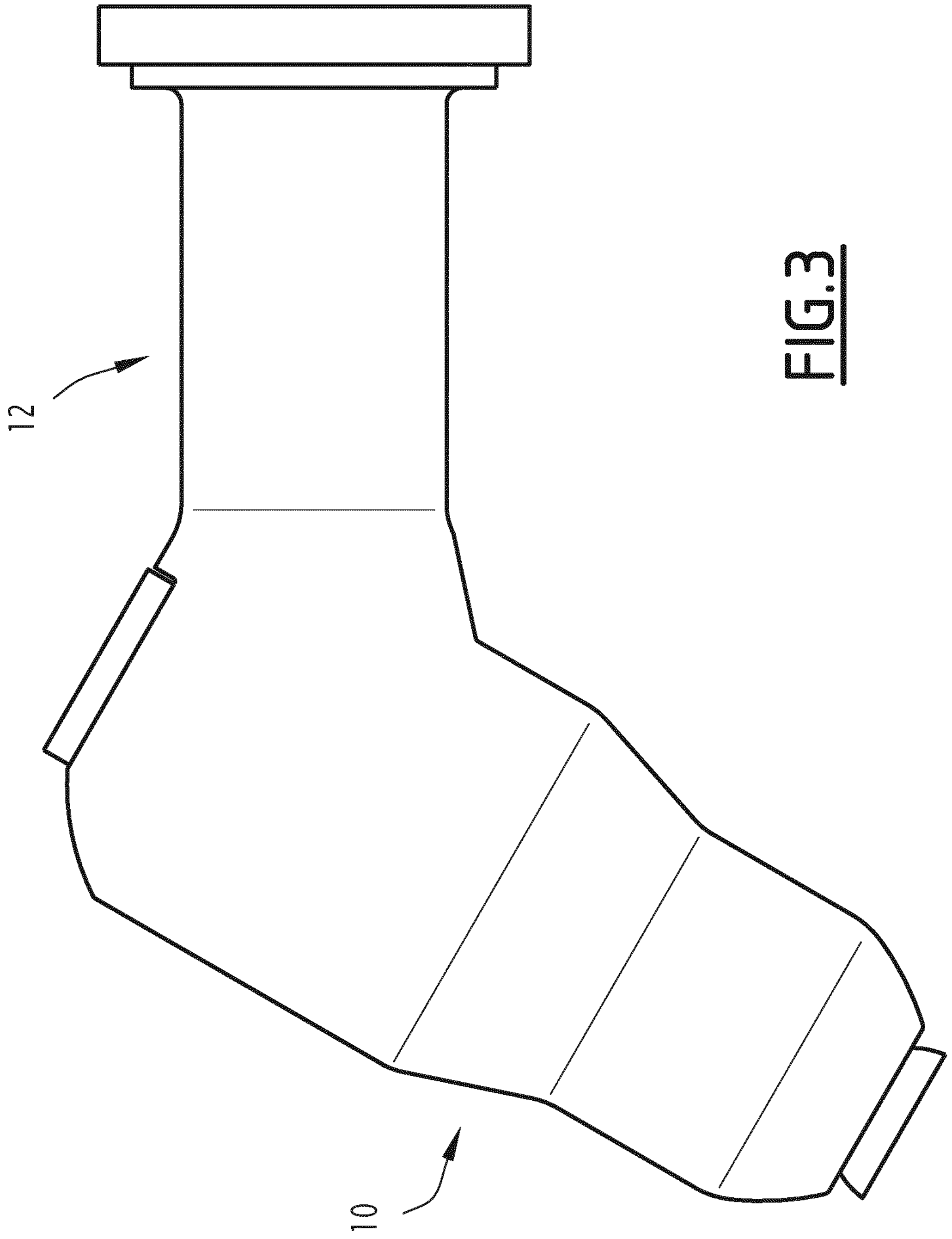
FIG. 3 is a perspective view of a fluid-spraying device.

As shown in FIG. 3, the facility 10 is connected to a support which is fastened on a robot. The assembly forms a "sprayer".

The facility 10 includes a portion 15 and a spraying device 20 for spraying the fluid F.

The fluid F is in particular a coating device such as a paint or a varnish. For example, the fluid F is a paint or varnish provided to at least partially cover an automobile body panel.

The portion 15 supports the device 20. The portion 15 is in particular configured to move the device 20 in space, in particular to orient the device 20 in a plurality of directions in space.

The portion 15 is for example an articulated arm comprising actuators able to pivot the various segments of the arm 15 relative to one another in order to move and orient the device 20 in space.

The portion 15 is further provided to supply the device 20 with a voltage or an electric current, with at least one stream of gas G and with a stream of the fluid F to be sprayed.

The gas G is for example air.

The portion 15 for example has a substantially planar fastening face 22. The device 20 is mounted on the fastening face 22.

The fastening face 22 is for example passed through by a plurality of supply ducts of the portion 15 for supplying gas G and fluid F, and by electrical power conductors of the device 20.

The device 20 is configured to spray the fluid F. The device 20 includes a turbine 25, a bowl 30, a skirt 35 and an injector 40.

The turbine 25 is configured to rotate the bowl 30 about an axis A, called "common axis." In particular, the turbine 25 is configured to receive a first stream of gas G from the portion 15, and to rotate the bowl 30 about the common axis A under the effect of the first stream of gas G.

The turbine 25 includes a rotor 45 and a body 50, also sometimes called "stator."

An upstream direction D1 and a downstream direction D2, shown in FIG. 1, are defined for the common axis A. The upstream direction D1 and the downstream direction D2 are co-linear and opposite each other.

The upstream direction D1 is such that the turbine 25 is offset relative to the skirt 35 along the upstream direction D1.

The downstream direction D2 is such that the skirt 35 is offset along the downstream direction D2 relative to the turbine 25.

The turbine 25 is interposed between the skirt 35 and the fastening face 22 of the portion 15 along the common axis A. In particular, the fastening face 22, the turbine 25 and the skirt 35 are superimposed in this order along the downstream direction D2.

The rotor 45, the skirt 35 and the injector 40 are directly assembled on the turbine body 50.

"Directly assembled" in particular means a relationship in which two parts are kept in position relative to one another by contact between these two parts. For example, any relative translational movement of these two parts is prevented by the contact between these two parts. Two parts which are secured in translation but movable in rotation relative to one another about the common axis may be qualified as "directly assembled" one on the other.

In particular, at least one face of each of the parts is in contact with the other part to ensure the fastening of the two parts to one another.

A first part screwed to a second part by a screw jointly passing through the first part and the second part is for example directly assembled on the second part if the two parts are in contact with one another.

On the contrary, two parts are not directly assembled one on the other if they are not in contact with one another but are each fastened to a single other part.

In particular, when the rotor 45, the skirt 35 and the injector 40 are directly mounted on the turbine body 50, the turbine body 50 is able to allow a relative positioning of the rotor 45, the skirt 35 and the injector 40. In other words, the turbine body 50 keeps the rotor 45, the skirt 35 and the injector 40 in position relative to one another.

Thus, the turbine body 50, the rotor 45, the skirt 35 and the injector 40 form a set of parts which are secured in translation relative to one another.

Further, the turbine body 50 has a shape which is suitable for allowing air to be conveyed toward the skirt 35.

The rotor 45 is assembled directly on the turbine body 50.

The rotor 45 is rotatable about the common axis A relative to the turbine body 50. The rotor 45 is in particular configured to be rotated relative to the turbine body 50 by the first stream of gas G.

The rotor 45 delimits a first receiving chamber 52 of the injector 40.

The rotor 45 includes a first section 55 and a second section 60.

The first chamber 52 extends along the common axis A.

The first chamber 52 for example has a symmetry of revolution about the common axis A. In particular, the first chamber 52 is cylindrical about the common axis A.

A first inner diameter is defined for the first chamber 52. The first inner diameter is between 10 millimeters (mm) and 20 mm.

The first chamber 52 passes through the rotor 45 along the common axis A. In particular, the first chamber 52 passes through both the first section 55 and the second section 60 along the common axis A.

The first section 55 is offset along the downstream direction D2 relative to the second section 60. The first section 55 is delimited along the upstream direction D1 by the second section 60.

The first section 55 has a first outer diameter. The first outer diameter is between 20 mm and 40 mm. The first section 55 is configured to rotate the bowl 30 about the common axis A.

The first section 55 has a first downstream end 65 which is able to cooperate with the bowl 30 in order to secure the first section 55 and the bowl 30, and a first upstream end 70 which is fastened to the second section 60. Among the first downstream end 65 and the first upstream end 70, the first downstream end 65 is offset along the downstream direction D2 relative to the first upstream end 70.

The first section 55 has a cylindrical outer face about the common axis A which is able to cooperate with the turbine body 50 in order to guide the rotation of the rotor 45 about the common axis A. The outer face of the first section 55 delimits the first section in a plane perpendicular to the common axis A.

The second section 60 has a first upstream face 75, a first side face 80 and a first downstream face 85.

The second section 60 is delimited along the common axis A by the first upstream face 75 and by the first downstream face 85.

The first upstream face 75 is offset along the upstream direction D1 relative to the first downstream face 85.

The first upstream face 75 is perpendicular to the common axis A. The first upstream face 75 faces the upstream direction D1.

The first upstream face 75 is substantially planar.

The first upstream face 75 is passed through along the common axis by the first chamber 52.

The first upstream face 75 includes, in a known manner, drive members 88 configured to rotate the rotor 45 when the first stream of gas G is oriented over the drive members 88.

The drive members 88 in particular comprise a set of blades.

Figure 2:
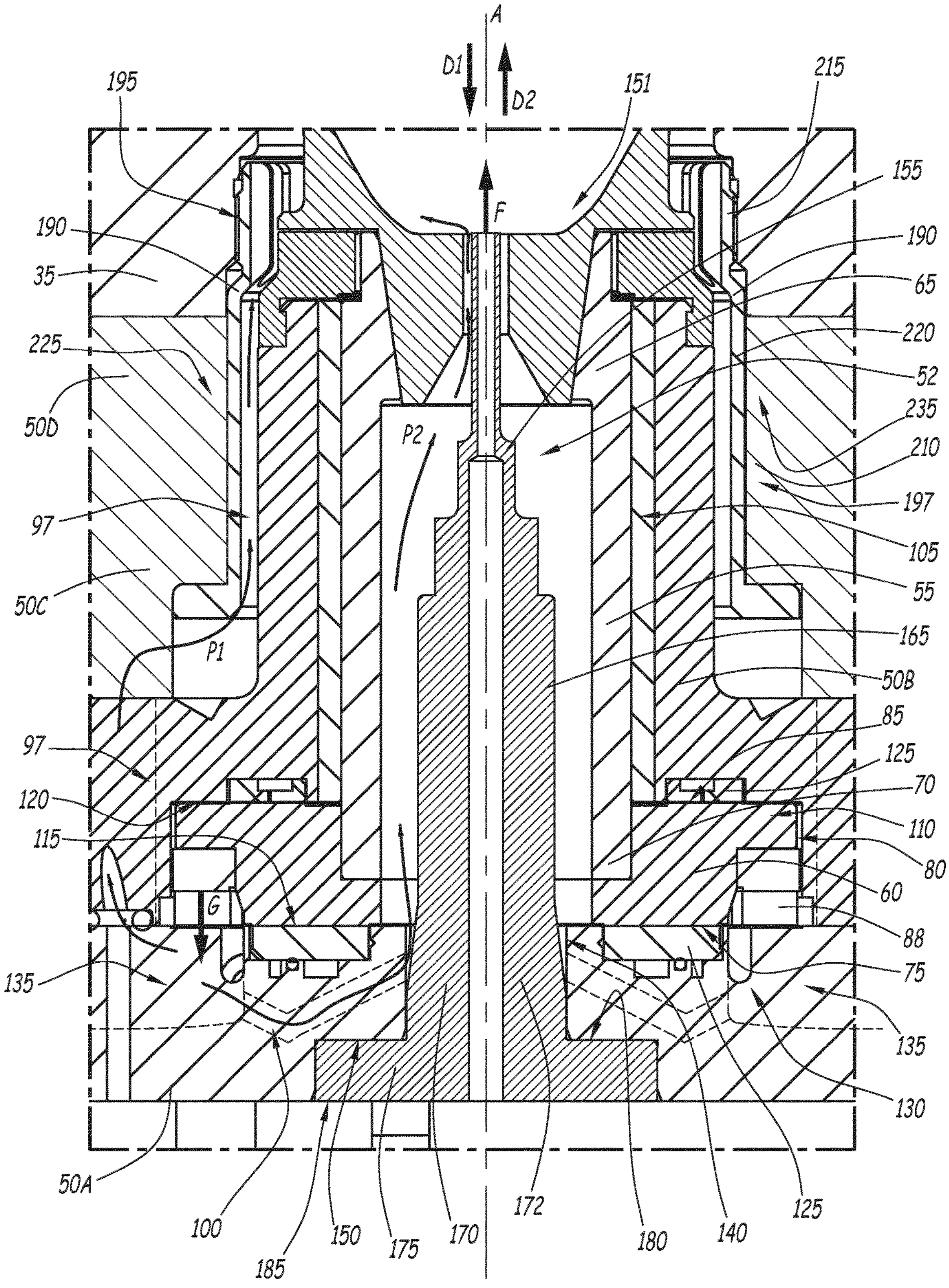
FIG. 2 is an enlarged view of box II of FIG. 1.

According to the example of FIG. 2, the drive members 88 are arranged on a perimeter of the first upstream face 75.

The first side face 80 delimits the second section 60 in a plane perpendicular to the common axis 80.

The first side face 80 is cylindrical about the common axis A.

The first side face 80 has a second outer diameter. The second outer diameter is between 50 mm and 60 mm.

The first downstream face 85 surrounds the first section 55 in a plane perpendicular to the common axis A.

The first downstream face 85 faces the downstream direction D2.

The first downstream face 85 is substantially planar.

The turbine body 50 is assembled directly on the portion 15. For example, the turbine body 50 is secured in rotation and in translation with the portion 15.

In particular, the turbine body 50 is fastened to the fastening face 22 of the portion 15, for example by a plurality of screws.

Thus, the rotor 45, the injector 40 and the skirt 35 are each assembled on the portion 15 by means of the turbine body 50.

According to the example spraying device 20 shown in FIGS. 1 and 2, the turbine body 50 includes a first part 50A, called flange 50A, a second part 50B, a third part 50C and a fourth part 50D.

It should be noted that the number and the arrangement of the various parts 50A to 50D making up the turbine body 50 may vary. This is in particular the case for the third part 50C and the fourth part 50D.

The flange 50A, the second part 50B, the third part 50C and the fourth part 50D are aligned in this order along the common axis A, the flange 50A being offset along the upstream direction D1 relative to the second part 50B, which is offset along the upstream direction D1 relative to the third part 50C, which in turn is offset along the upstream direction D1 relative to the fourth part 50D.

The flange 50A is interposed between the second part 50B and the fastening face 22.

The turbine body 50 has a first end face 90 and a second end face 95. The turbine body 50 is delimited along the common axis A by the first end face 90 and by the second end face 95.

The turbine body 50 is configured to receive the first stream of gas G from the portion 15, in particular through the fastening face 22, and to supply the rotor 45 with the first stream of gas G in order to rotate the rotor 45. For example, the turbine body 50 is configured to guide the first stream of gas G to the drive members 88.

The turbine body 50 is also configured to receive the first stream of gas G at the outlet of the rotor 45 and to guide the first stream of gas G to the outside of the spraying device 20.

The turbine body 50 is further configured to guide a first portion P1 of the first stream of gas G received from the rotor 45 to the skirt 35. To this end, the turbine body 50 delimits at least a first outlet duct 97. According to the example shown in FIG. 1, the turbine body 50 delimits two such first outlet ducts 97.

The turbine body 50 is further configured to receive a second stream of gas G from the portion 15 and to supply the skirt 35 with the second stream of gas G without the second stream of gas G rotating the rotor 45.

The turbine body 50 surrounds the rotor 45 in a plane perpendicular to the common axis A.

The turbine body 50 is configured to rotate the rotor 45.

The turbine body 50 delimits a second receiving chamber of the rotor 45 and a third receiving chamber 57 of the injector 40.

The turbine body 50 is further configured to guide a second portion P2 of the first stream of gas G received from the rotor 45 to the second chamber. To this end, the turbine body 50 delimits at least one second outlet duct 100. According to the example shown in FIG. 1, the turbine body 50 delimits two such second outlet ducts 100.

The first end face 90 is arranged in the fourth part 50D.

The first end face 90 is offset along the downstream direction D2 relative to the second end face 95. The first end face 90 faces the downstream direction D2.

The second end face 95 is in particular arranged in the flange 50A. In particular, the flange 50A is delimited by the second end face 95 along the common axis A.

The second end face 95 bears against the fastening face 22 of the portion 15. The second end face 95 is substantially planar.

The second chamber includes a bearing which is stationary and secured to the turbine body 50.

The bearing allows the injection and maintenance of a film of air with the rotor 45 to allow its rotation at a high speed.

The second chamber also includes an element able to produce sounds detectable by a microphone, the injection of air being specific. The element makes it possible to estimate the speed of the turbine 25.

The first cavity 105 and the second cavity 110 communicate with one another.

The first cavity 105 and the second cavity 110 are each cylindrical with a circular base about the common axis A.

The first cavity 105 is offset along the downstream direction D2 relative to the second cavity 110.

The first cavity 105 accommodates the first section 55 of the rotor 45.

The first cavity 105 is configured to guide the rotation of the first section 55 of the rotor 45.

The second cavity 110 accommodates the second section 60 of the rotor 45.

The second cavity 110 is delimited along the common axis A by a second upstream face 115 and a second downstream face 120 of the turbine body 50.

The second cavity 110 is substantially cylindrical about the common axis A.

The second section 60 of the rotor 45 is inserted between the second upstream face 115 and the second downstream face 120 along the common axis A. For example, the second section 60 is clamped by the second upstream face 115 and the second downstream face 120.

The second upstream face 115 is for example arranged in the flange 50A, which is shown alone in FIG. 3.

In particular, the flange 50A is delimited along the common axis A by the second end face 95 and by the second upstream face 115. The flange 50A is in particular passed through from the second end face 95 to the second upstream face 115 by a passage assembly provided to allow the passage of electrical conductors, streams of fluid F and streams of gas G.

The second upstream face 115 is offset along the upstream direction D1 relative to the second downstream face 120.

The second upstream face 115 is opposite the first upstream face 75 of the rotor 45.

The second upstream face 115 for example includes guide members 125 which are able to allow the rotor 45 to rotate [relative] to the turbine body 50. These guide members 125 are for example microperforated parts which make it possible to create a film of air. The guide members 125 are for example accommodated in an annular channel 127 centered on the common axis and arranged in the second upstream face 115.

The second upstream face 115 is perpendicular to the common axis A.

The second upstream face 115 includes an annular groove 130 and at least one radial groove 135. For example, the second upstream face 115 includes two radial grooves 135, one for each first outlet duct 97.

The annular groove 130 and the radial groove(s) 135 are arranged in the flange 50A.

The annular groove 130 is configured to collect the first stream of gas G leaving the rotor 45. In particular, the annular groove 130 is opposite the drive members 88.

The annular groove 130 is configured to transmit the first portion P1 of each first stream of gas G to each first outlet duct 97. In particular, the annular groove 130 is configured to transmit the first portion P1 to each first outlet duct 97 via the corresponding radial groove 135.

The annular groove 130 is further configured to transmit each second portion P2 of the first stream of gas G received from the rotor 45 to the corresponding second outlet duct 100.

The annular groove 130 is centered on the common axis A. In particular, the annular groove 130 is delimited by two cylindrical faces about the common axis A of the turbine body 50.

The annular groove 130 has an outer diameter of between 40 mm and 45 mm. The annular groove 130 has an inner diameter of between 45 mm and 50 mm.

The annular groove 130 has a depth, measured along the common axis A, of between 1 mm and 10 mm.

Each radial groove 135 extends along a rectilinear specific line L1 contained in a plane perpendicular to the common axis A and is concurrent with the common axis A. The specific lines L1 of the radial grooves 135 are for example combined with one another. In other words, the radial grooves 135 are diametrically opposite.

Each radial groove 135 extends radially outward from the annular groove 130. The annular groove 130 is in particular inserted between the two radial grooves 135.

Each radial groove 135 emerges in the annular groove 130.

Each radial groove 135 has a length, measured from the annular groove 130 along the specific line L1, of between 15 mm and 20 mm.

Each radial groove 135 has a width, measured in a plane perpendicular to the common axis A and along a direction perpendicular to the specific line L1, of between 10 mm and 18 mm.

Each radial groove 135 has a depth, measured along the common axis A, of between 5 mm and 15 mm. The depth of the radial groove 135 is for example equal to the depth of the annular groove 130.

The second downstream face 120 is perpendicular to the common axis A. The second downstream face 120 is opposite the second upstream face 115.

The second downstream face 120 is substantially planar.

The second downstream face 120 is able to prevent the rotor 45 from moving in the downstream direction D2 relative to the turbine body 50.

The second downstream face 120 bears against the first downstream face 85, for example by means of guide members 125.

Each first outlet duct 97 is for example jointly delimited by the second part 50B, the third part 50C and the fourth part 50D. In particular, each first outlet duct 97 includes a plurality of sections emerging one in the other, these sections each being delimited by one of the second part 50B, the third part 50C and the fourth part 50D.

Each first outlet duct 97 is configured to conduct a first portion P1 of the first stream of gas G from the annular groove 130 to the skirt 35.

In particular, each first outlet duct 97 opens onto the first end face 90, which is opposite the skirt 35. According to the embodiment shown in FIGS. 1 and 2, each first outlet duct 97 is configured to conduct the corresponding first portion P1 into the free space separating the bowl 30 from the skirt 35.

Each first outlet duct 97 opens into the corresponding radial groove 135.

Each first outlet duct 97 is entirely delimited by the turbine body 50. In other words, each first outlet duct 97 is arranged in the turbine body 50 and only therein. The first portion P1 circulating in the first outlet duct 97 is therefore only in contact with the turbine body 50 while the first portion P1 circulates in the first outlet duct 97.

Each first outlet duct 97 therefore forms, with the corresponding radial groove 135 and with the annular groove 130, a passage connecting the rotor 45 to the first end face 90. This passage is entirely delimited by the turbine body 50.

Each second outlet duct 100 is for example arranged in the flange 50A.

Each second outlet duct 100 is configured to transmit a second portion P2 of the first stream of gas G from the annular groove 130 to the third chamber 57.

Each second outlet duct 100 is entirely delimited by the turbine body 50. In other words, each second outlet duct 100 is arranged in the turbine body 50 and only therein. The second portion P2 circulating in the second outlet duct 100 is therefore only in contact with the turbine body 50 while the second portion P2 circulates in the second outlet duct 100.

Each second outlet duct 100 therefore forms, with the annular groove 130, a passage connecting the rotor 45 to the third chamber 57. This passage is entirely delimited by the turbine body 50.

The third chamber 57 is arranged in the flange 50A.

The third chamber 57 is configured to partially accommodate the injector 40.

The third chamber 57 is offset along the upstream direction D1 relative to the second chamber.

The third chamber 57 opens onto the second end face 95 and onto the second upstream face 115. The third chamber 57 therefore communicates with the second chamber, in particular with the second cavity 110 of the second chamber.

The third chamber 57 includes a third cavity 140 and a fourth cavity 145.

Each of the third cavity 140 and the fourth cavity 145 is cylindrical about the common axis A.

The third cavity 140 is inserted between the fourth cavity 145 and the second cavity 110.

The third cavity 140 has a diameter of between 12 mm and 15 mm. The third cavity 140 has a length, measured along the common axis A, of between 10 mm and 30 mm. Each second outlet duct 100 opens into the third cavity 140.

The first bearing face 150 is annular, and centered on the common axis A. The first bearing face 150 is substantially planar. The first bearing face 150 is perpendicular to the common axis A.

The first bearing face 150 delimits the fourth cavity 145 along the downstream direction D2.

The first bearing face 150 is provided to bear against the injector 40 so as to prevent the injector 40 from moving along the downstream direction D2 relative to the turbine body 50.

The bowl 30 is assembled directly on the rotor 45. In particular, the bowl 30 is fastened to the first upstream end 65 of the first section 55 of the rotor 45. The rotor 45 is then inserted between the bowl 30 and the second upstream face 115 along the common axis A.

The bowl 30 is configured to be rotated about the common axis A by the rotor 45 in order to generate the stream of fluid F to be sprayed.

The bowl 30 is configured to receive the fluid F to be sprayed from the injector 40 at the bottom 151 of the bowl 30.

The bowl 30 protrudes relative to the skirt 35 along the downstream direction D2.

The skirt 35 is configured to generate a set of jets of gas G, these jets being suitable for molding the sprayed fluid F. For example, the skirt 35 is configured to receive the first stream and the second stream of gas G and to generate the jets of gas G from the first and second received streams.

The skirt 35 surrounds the bowl 30 in a plane perpendicular to the common axis A. The skirt 35 in particular delimits an opening 152 for receiving the bowl 30. This opening 152 opens onto the face of the skirt which delimits the skirt 35 in the downstream direction D2.

The skirt 35 bears against the first end face 90 of the turbine body 50. The turbine body 90 is inserted, along the common axis A, between the fastening face 20 of the portion 15 and the skirt 35.

The skirt 35 is fastened to the turbine body 50 so as to eliminate all of the degrees of freedom between the turbine body and the skirt 50.

The injector 40 is configured to inject the stream of fluid F to be sprayed in the bottom 151 of the bowl 30.

The injector 40 is assembled directly on the turbine body 50. In particular, the injector 40 is received at least partially in the third chamber 57.

The injector 40 is configured so that, when the injector 40 is received in the third chamber 57, a relative translational movement of the injector 40 with respect to the turbine body 50 in a plane perpendicular to the common axis A is prevented.

Optionally, the injector 40 is further fastened to the turbine body 50 by fastening means such as screws in order to prevent a respective rotation of the injector 40 and of the turbine body 50 about the common axis A, and/or to prevent a relative translation of these two parts along the common axis A.

The injector 40 is received in the first chamber 52 arranged in the rotor 45.

The injector 40 is configured to allow a relative rotational movement about the common axis A between the rotor 45 and the injector 40. In particular, the injector 40 is not in contact with the walls of the rotor 45 which delimit the first chamber 52.

The rotor 45 and the injector 40 delimit a free volume, which corresponds to the section of the first chamber 52 which is complementary to the injector 40.

The injector 40 includes an injection member 155 and an injector body 160.

The injector 40 is configured so that the free volume is in communication with the bottom 151 of the bowl 30. For example, the injection member 155 is received in a cavity of the bowl 30 opening into the bottom 151 of the bowl 30, and has an outer diameter which is strictly inside the inner diameter of this cavity, such that a gas, in particular the gas G, is able to circulate from the free volume to the bottom 151 of the bowl 30 in the interval comprised between the walls of this cavity and the injection member 155.

Further, the injector 40 is configured so that each second outlet duct 100 is in communication with the free space. Thus, the second outlet duct 100 and the free space forming auxiliary duct which is able to transmit the second portion P2 of the first stream of gas G from the annular groove 130 to the bottom 151 of the bowl 30.

The injection member 155 is configured to inject the stream of fluid F to be sprayed in the bottom 151 of the bowl 30.

The injection member 155 is offset along the second direction D2 relative to the injector body 160.

The injector body 160 is configured to receive the stream of fluid to be sprayed F from the portion 15, and to transmit the stream of fluid to be sprayed F to the injection member 155.

The injector body 160 includes a third section 165, a fourth section 170, a fifth section 172 and a collar 175.

The third section 165, the fourth section 170, the fifth section 172 and the collar 175 are offset in this order relative to one another along the upstream direction D1.

The injection member 155 is assembled on the third section 165.

The third section 165 is cylindrical about the common axis A. The third section 165 is delimited along the common axis by the injection member 155 and by the fifth section 172.

The diameter of the third section 165 is between 5 mm and 15 mm.

The fourth section 170 is delimited along the common axis A by the collar 175 and by the fifth section 172.

The fourth section 170 is accommodated in the third cavity 140.

The fourth section 170 is cylindrical about the common axis A.

The diameter of the fourth section 170 is strictly greater than the diameter of the third section 165.

The fourth section 170 has a length, measured along the common axis, strictly less than the distance between the end of each second duct 100 and the fourth cavity 145, such that each second duct 100 opens into the third cavity 140 opposite the fifth section 172.

The fifth section 172 is inserted along the common axis A between the third section 135 and the fourth section 170.

The fifth section 172 is delimited along the common axis A by the third section 135 and the fourth section 170.

The fifth section 172 is in the form of a frustum centered on the common axis A. The diameter of the fifth section 172 decreases from an end delimited by the fourth section 170 to another end delimited by the third section 165.

In particular, opposite the end of each second outlet duct 100 which opens into the third cavity 140, the diameter of the fifth section 172 is strictly less than the diameter of this third cavity.

In this way, the second portion P2 of the first stream of gas G can be delivered by the second outlet duct 100 into the free volume.

The collar 175 is cylindrical about the common axis A.

The collar 175 has a thickness, measured along the common axis, which is substantially equal to the length of the fourth cavity 145.

The diameter of the collar 175 is substantially equal to the diameter of the fourth cavity 180. The collar 175 has a second bearing face 180 and a third bearing face 185. The collar 175 is delimited along the common axis A by the second and third bearing faces 180 and 185. The thickness of the collar 175 is measured between the second and third bearing faces 180 and 185.

The second bearing face 180 is perpendicular to the common axis A.

The second bearing face 180 bears against the first bearing face 150. Thus, a translation of the injector 40 along the downstream direction D2 relative to the turbine body 50 is prevented.

The third bearing face 180 for example bears against the fastening face 22 of the portion 15 when the spraying device 20 is fastened to the portion 15, such that the collar 75 is clamped between the fastening face 22 and the first bearing face 150 arranged in the turbine body 50. In particular, the third bearing face 180 and the second bearing face 95 are coplanar.

It should be noted that in certain considered embodiments, the thickness of the collar 175 is strictly less than the length of the fourth cavity 145, such that the third bearing face 180 does not bear against the fastening face 22.

A method for manufacturing the facility 10 will now be described.

In a first step, the rotor 45, the skirt 35 and the injector 40 are assembled directly on the turbine body 50.

For example, the second, third and fourth parts 50B, 50C and 50D are fastened to one another. The rotor 45 is next inserted into the second chamber by a translation along the downstream direction D2, then the flange 50A is fastened to the second part 50B in order to grip the second section 60 of the rotor 45. The rotor 45 is therefore fastened to the turbine body 50 by a mechanical link allowing a single degree of freedom, which is a rotation along the common axis A.

The injector 40 is inserted into the second and third chambers 52, 57 by a translational movement along the downstream direction D2 until the second bearing face 180 is pressed against the first bearing face 150. The injector 40 is then fastened to the turbine body by a mechanical link allowing only a relative translation along the upstream direction D1 between these two parts, and optionally a relative rotation about the common axis A.

Optionally, the injector 40 is further fastened to the turbine body 50 by fastening members so as to eliminate all of the remaining degrees of freedom between these two parts.

The skirt 35 is next positioned against the turbine body 50 such that the skirt 35 bears against the first end face 90. The skirt 35 is fastened to the turbine body 50 so as to eliminate all of the degrees of freedom between the skirt 35 and the turbine body 50.

Thus, at the end of the first step, an assembly is obtained comprising the turbine body 50, the rotor 45, the skirt 35 and the injector 40. The various elements of this assembly are secured to one another in translation.

During a second step, the bowl 30 is assembled on the rotor 45 in order to form the spraying device 20.

The third step is carried out after the first step.

During a third step, the assembly comprising the turbine body 50, the rotor 45, the skirt 35 and the injector 40 is assembled on the portion 15.

In particular, the turbine body 50 is assembled directly on the portion 15, for example by bearing of the second end face 95 against the fastening face 22 and by screws jointly passing through the portion 15 and the turbine body 50. Thus, the turbine body 50 and the portion 15 form a mechanical link eliminating all of the degrees of freedom between the turbine body 50 and the portion 15.

According to one embodiment, the third step is carried out after the second step. For example, the spraying device 20, further comprising the bowl 30, is fastened to the portion 15.

Since the rotor 45, the skirt 35 and the injector 40 are all directly assembled on the turbine body 50, the relative positioning of these parts is improved. Likewise, the precision of the positioning of the skirt 35 and the injector 40 relative to the bowl 30 is improved, in particular with respect to the known devices where the skirt 35 and the injector 40 are fastened to the portion 15 and not to the turbine body 50. Indeed, the number of parts involved in the positioning of the bowl 30 with respect to the skirt 35 and to the injector 40 is decreased, since only the turbine body 50 and the rotor 45 connect the bowl 30 to the skirt 35 and to the injector 40.

The improvement in the positioning of the bowl 30 with respect to the skirt 35 and to the injector 40 allows better control of the molding of the sprayed fluid F, since the jets of gas G to mold the jet of fluid F are better positioned with respect to the bowl 30.

Furthermore, the replacement of the spraying device 20 is made faster, since it is possible to preassemble the rotor 45, the skirt 35 and the injector 40 on the turbine body 50, and to preassemble the bowl 30 on the rotor 45, before fastening the device 20 thus obtained simply on the portion 15, solely by fastening the turbine body 50 to the portion 15.

The presence of the first duct 97 makes it possible to inject the first portion P1 of the first stream G between the bowl 30 and the skirt 35, this air serving as compensation air to fill the vacuum below the bowl related to the rotation of the bowl and to the injection of the skirt airs.

This makes it possible to divert the air directly into the turbine. This results in a better delayed differentiation over all of the different sprayer bodies. Further, avoiding grooves in the plastic body provides more solidity for the latter and allows greater positioning and piercing inclines, therefore more space in smaller bodies. This also makes it possible to avoid very cold exhaust air in a zone where metal inserts comingle to provide high voltage and plastic with all of the constraints associated with the various expansions of the materials.

More specifically, the stream of cold air circulating internally inside the turbine, the stream of cold air whose temperature can be as cold as −40°, does not come into contact with an interface between plastic and metal elements. Indeed, since the two materials have different expansion coefficients, the exposure to cold air could cause sealing problems.

Therefore, notwithstanding the fact that the use of a metal turbine as reference makes it possible to improve precision, the chosen conformation for the turbine also makes it possible to improve the durability of the sealing in the sprayer.

The auxiliary passage makes it possible to inject the second portion P2 into the bottom 151 of the bowl 30 and thus to fill a vacuum that could be caused there by the rotation of the bowl 30.

Furthermore, the portion 15 and in particular the fastening face 22 are simplified when the ducts 97 and 100 are arranged in the turbine body 50, since it is the turbine body 50 which receives the first stream of gas G leaving the rotor 45. It is therefore not necessary to mold the fastening face 22 so as to receive and discharge the first stream of gas G leaving the rotor.

Further, the relative positioning of the injector 40 with respect to the turbine body 50 is better controlled. This results in better control of the distribution of the first stream of gas G, leaving the rotor 45, between the first portion P1 and the second portion P2.

According to certain embodiments, the turbine body 25 is arranged so that during operation, the ratio between the flow rate of the first portion P1 of the stream of gas and the second portion P2 of the stream of gas is greater than or equal to 2, preferably greater than or equal to 3 and preferably greater than or equal to 10. Such an effect is in particular obtained by a careful choice of the size of the outlet duct 97 and the size of the auxiliary passage.

The annular groove 130 allows a collection of the first stream of gas G leaving the rotor 45 with a very reduced axial bulk. The dimensions of the spraying device 20 are therefore reduced.

The radial grooves 135 make it possible to recover an increasing amount of exhaust air without re-compressing it so as not to slow the turbine 25. When the radial grooves 135 are diametrically opposite one another, the first portions P1 of the streams of gas G collected by the ducts 97 are equal. The stream of gas G injected between the skirt 35 and the bowl 30 is then more spatially homogeneous.

The bearing of the first and second bearing faces 150 and 180 allows precise and simple positioning of the injector 40 relative to the turbine body 50.

In order to simplify the description of the first example above, it has not been described in detail how the skirt 35 is fastened to the turbine body 50 after the bearing of the skirt 35 against the first end face 90.

Many fastening means can be used to eliminate all of the degrees of freedom between the skirt 35 and the turbine body 50, for example screws jointly passing through the skirt 35 and the turbine body 50. It should be noted that other means can be used to directly assemble the skirt 35 on the turbine body 50. For example, the skirt 35 and the turbine body 50 have complementary screw pitches to one another so as to allow the skirt 35 to be screwed on the turbine body 50.

Figure 4:
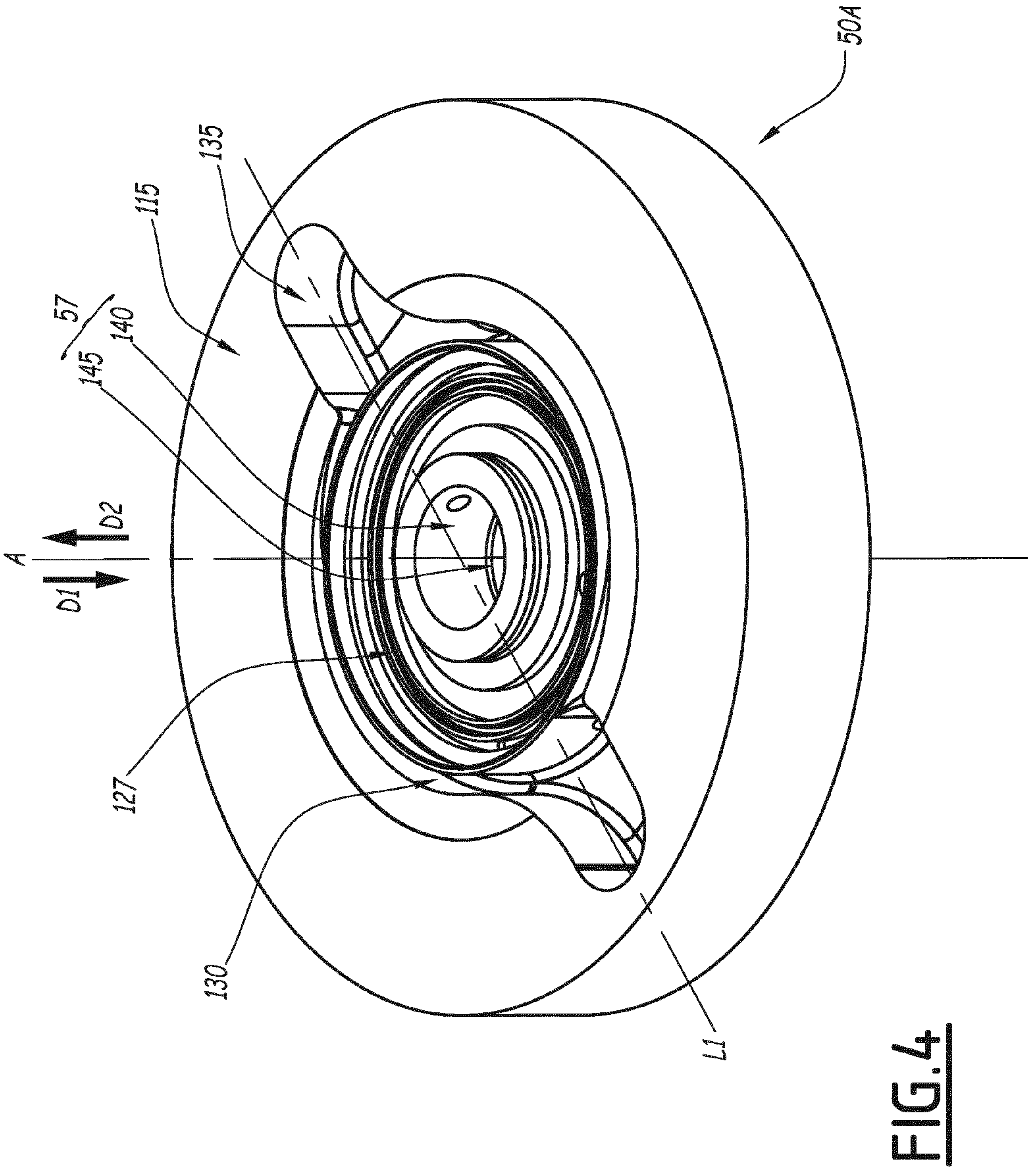
FIG. 4 is a perspective view of the flange of FIG. 1.
Figure 5:
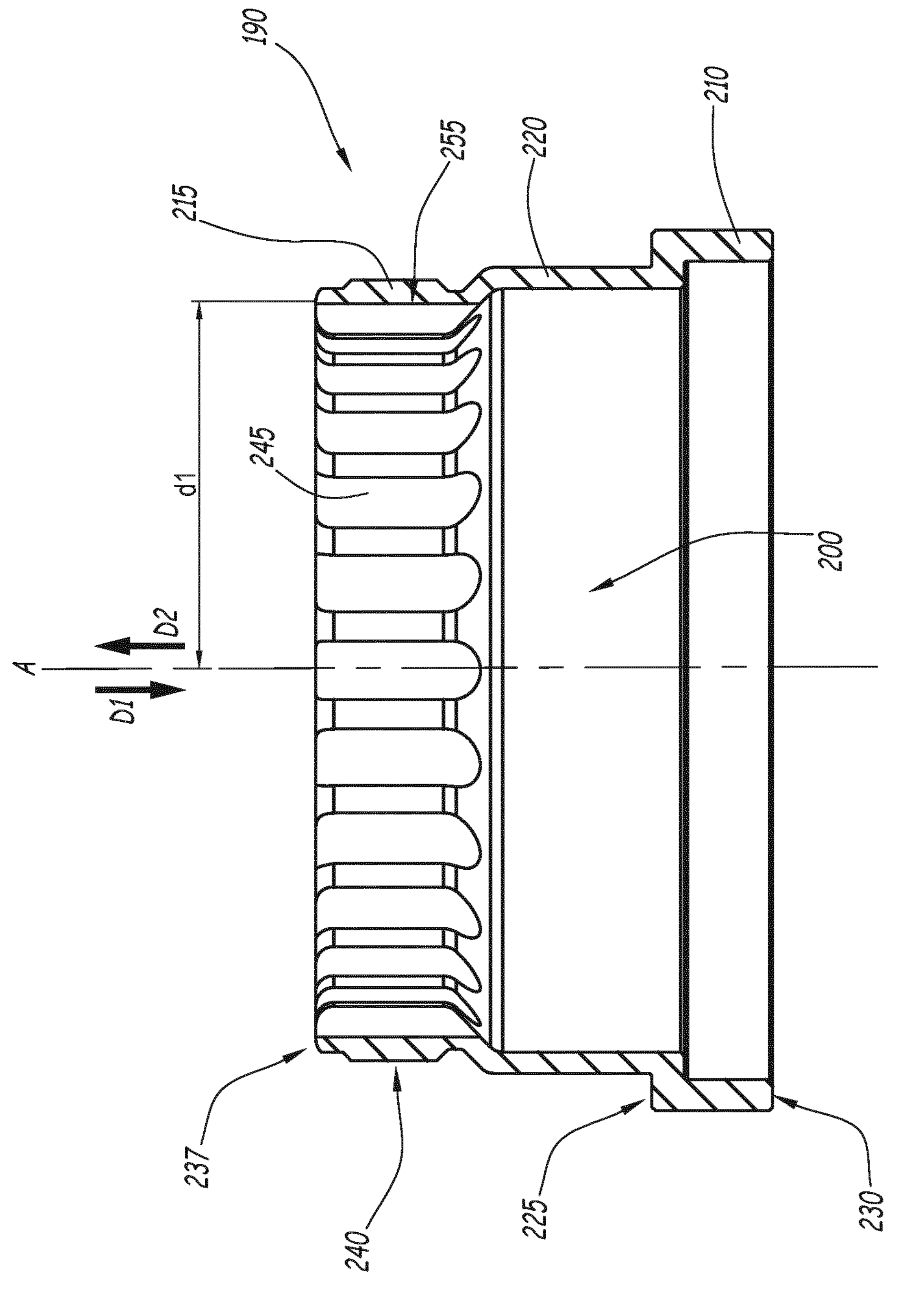
FIG. 5 is a cross-sectional view of the threaded tube of FIG. 1.

According to the specific embodiment shown in FIGS. 1 and 2, the fluid-spraying device 20 further includes a threaded tube 190, visible in particular in FIG. 2 and shown alone in FIGS. 4 and 5.

The skirt 35 has an inner face 193. The inner face 193 of the skirt 35 is the face of the skirt 35 which surrounds the bowl 30 and which is opposite the bowl 30. In particular, the inner face 193 delimits the opening 152 in which the bowl 30 is received.

The inner face 193 has a symmetry of revolution about the common axis A.

A minimum diameter is defined for the inner face 193 of the skirt 35. The minimum diameter is measured in a plane perpendicular to the common axis A between the two diametrically opposite points of the inner face 193 which are closest to one another.

The inner face 193 has a thread 195. The thread 195 surrounds the bowl 30 in a plane perpendicular to the common axis A.

The threaded tube 190 is sometimes called "nut" or "loose nut."

The threaded tube 190 is assembled coaxially to the skirt 35 and to the turbine body 50. In particular, the threaded tube 190 is centered on the common axis A.

The threaded tube 190 is assembled directly on the turbine body 50. In particular, the threaded tube 190 is secured to the turbine body 50 in translation.

According to one embodiment, the turbine body 50 delimits an annular groove 197 receiving at least one section of the threaded tube 190 and has faces able to prevent a relative translation of the threaded tube 190 and of the turbine body 50.

The annular groove 197 is for example arranged in the third part 50C and extends along the common axis A from a downstream surface of the third part 50C, this downstream surface delimiting the third part along the downstream direction D2.

The threaded tube 190 is rotatable about the common axis A with respect to the turbine body 50.

The threaded tube 190 is for example made from steel.

The threaded tube 190 has a symmetry of revolution about the common axis A.

The threaded tube 190 has an inner face 200 and an outer face 205. The threaded tube 190 is delimited by the inner face 200 and by the outer face 205 in a plane perpendicular to the common axis A.

The threaded tube 190 includes at least a primary section 210 and a secondary section 215. According to the example of FIG. 4, the threaded tube 190 further includes a tertiary section 220 inserted between the primary section 215 and the secondary section 215 along the common axis A.

The primary section 210 is offset along the upstream direction D1 relative to the tertiary section 220.

The primary section 210 is in the form of a cylinder with an annular base. In other words, the primary section 210 is delimited by two cylindrical surfaces each centered on the common axis A. The primary section 210 is in particular delimited by these two surfaces in a plane perpendicular to the common axis A.

The primary section 210 has a third downstream face 225 and a third upstream face 230.

The primary section 210 is surrounded by the turbine body 50 in a plane perpendicular to the common axis A. The primary section 210 is in particular accommodated in the opening 152.

The primary section 210 is accommodated in the annular groove 197. In particular, the faces of the turbine body 50 which delimit the annular groove 197 in a plane perpendicular to the common axis A are configured to prevent a translation of the threaded tube 190 relative to the turbine body 50 in a plane perpendicular to the common axis A.

The primary section 210 has an outer diameter of between 45 mm and 60 mm.

The primary section 210 has an inner diameter of between 40 mm and 55 mm.

The primary section 210 is delimited along the downstream direction D2 by the third downstream face 225. The third downstream face 225 is perpendicular to the common axis A. The third downstream face 225 faces the downstream direction D2.

The third downstream face 225 surrounds the tertiary section 220 in a plane perpendicular to the common axis A. The third downstream face 225 therefore forms a shoulder, since the outer diameter of the tertiary section 220 is strictly less than the outer diameter of the primary section 210.

The primary section 210 has a length, measured along the common axis A from the third downstream face 225, of between 5 mm and 20 mm. In particular, the length of the primary section 210 is greater than or equal to 40 mm.

The third downstream face 225 bears against a face 235 of the turbine body 50 in order to prevent a translation of the threaded tube 190 relative to the turbine body 50 along the downstream direction D2.

The face 235 is for example perpendicular to the common axis A. The face 235 faces the upstream direction D1. The face 235 is for example arranged in the fourth part 50D. The face 235 is, along the common axis A, opposite the annular groove 197. Thus, the face 235 delimits the annular groove 197 along the common axis A, in particular along the downstream direction D2.

The secondary section 215 is offset along the upstream direction D1 relative to the tertiary section 220.

The secondary section 215 is in the form of a cylinder with an annular base.

The secondary section 215 is surrounded by the skirt 35 in a plane perpendicular to the common axis A. For example, the secondary section 215 surrounds the bowl 30 in a plane perpendicular to the common axis A. The secondary section 215 is therefore inserted coaxially between the skirt 35 and the bowl 30.

The secondary section 215 has an outer diameter of between 40 mm and 60 mm.

The secondary section 215 has an inner diameter of between 30 mm and 55 mm.

The secondary section 215 has a length, measured along the common axis A, of between 5 mm and 20 mm.

The secondary section 215 has a third end face 237 delimiting the secondary section 215 along the common axis A. The third end face 237 is perpendicular to the common axis A. The third end face 237 in particular delimits the secondary section 215 along the downstream direction D2. The third end face 237 therefore faces the downstream direction D2.

The secondary section 215 has, on its outer face 205, a thread 240 configured to engage the thread 195 of the inner face 193 of the skirt 35 so as to exert a force on the skirt 35 tending to move the skirt 35, relative to the threaded tube 190, along the upstream direction D1.

Thus, since the third downstream face 225 bears against the face 235 of the turbine body 50 in order to prevent a translation of the threaded tube toward the downstream direction D1 with respect to the turbine body 50, a force tending to bring the skirt 35 closer to the turbine body 50 along the common axis and therefore to press the skirt 35 against the turbine body 50 is exerted by the tube 190 when the two threads 195 and 240 are engaged with one another.

The inner face 200 of the secondary section 215 is configured to cooperate with a tool 250 in order to transmit a force tending to rotate the threaded tube 190 about the common axis A. In particular, the inner face 200 of the secondary section 215 does not have a symmetry of revolution about the common axis A.

The inner face 200 of the second section 215 has, at least at one point, a normal direction perpendicular at this point to the inner face 200, an angle between this normal direction and a segment connecting this point to the common axis A being strictly greater than 5 degrees. The angle is measured in a plane perpendicular to the common axis A.

In other words, the inner face 200 of the secondary section 215 move at least 5 degrees away from a cylindrical surface about the common axis A at least at one point.

For example, at least one notch 245 is arranged in the inner face 200 of the secondary section 215. According to the example shown in FIGS. 4 to 6, a plurality of notches 245 is arranged in the inner face 200 of the secondary section 215, in particular 25 notches 245. It should be noted that the number of notches 245 may vary.

Figure 6:
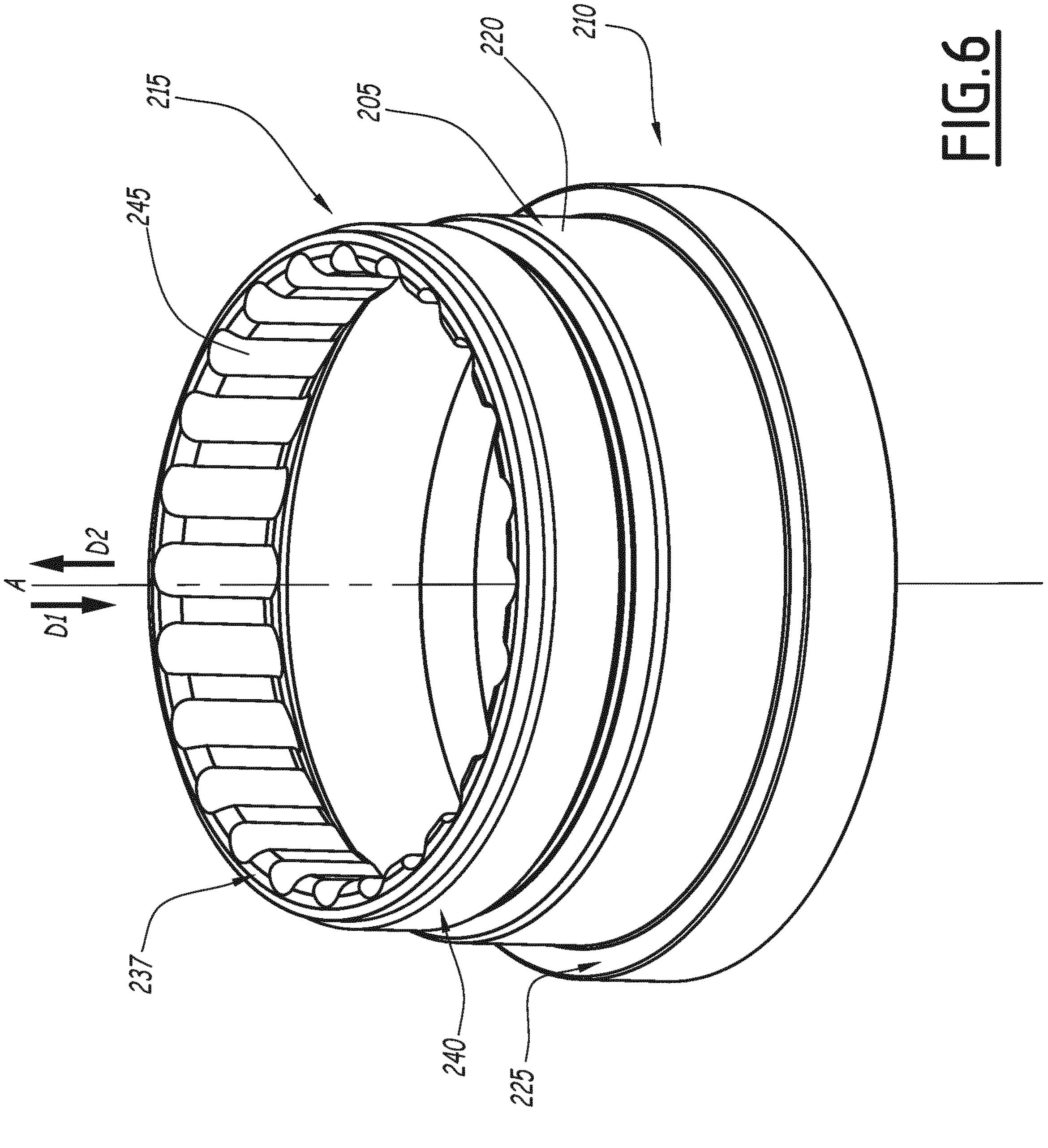
FIG. 6 is a perspective view of the threaded tube of FIG. 5.

The spraying device 20 is shown in FIG. 6, in a configuration where the bowl 30 has been removed from the spraying device 20. The notches 245 are then visible at the bottom of the opening 152 delimited by the skirt 35.

Each notch 245 opens onto the third end face 237.

Each notch 245 extends along a direction parallel to the common axis A. In particular, each notch 245 extends from the third end face 237.

Thus, a tool may be inserted into the notches 245 from the third end face 237 by a translation along the upstream direction D1.

Each notch 245 has a uniform cross-section along the common axis A. In particular, the shape and the dimensions of each notch 245 are invariant by translation along a direction parallel to the common axis A along the notch 245.

Each notch 245 for example has an arcuate cross-section in a plane perpendicular to the common axis A.

Each notch 245 has a depth of between 0.5 mm and 3 mm.

Each notch 245 has a bottom 255. The bottom 255 is the set of points of the notch 245 positioned at a distance, measured between the considered point and the common axis A in a plane perpendicular to the common axis A, strictly greater than the distances of all of the other points.

When the notch 245 has an arcuate cross-section, the bottom 255 is a line extending along a direction parallel to the common axis A.

Each point of the bottom 255 of each notch 245 is positioned at a distance d1 from the common axis A, the distance d1 being less than or equal to half of the minimum diameter of the inner face of the skirt 35.

The tertiary section 220 is cylindrical with an annular base. The tertiary section 220 connects the primary section 210 to the secondary section 215.

The secondary section 220 is in particular inserted in a plane perpendicular to the common axis A between the second part 50B and the fourth part 50D.

The tool 250 is configured to engage the inner face 200 of the secondary section 215 in order to rotate the threaded tube

190 about the common axis A. The tool 250 is in particular configured to transmit a force to the threaded tube 190 tending to pivot the tube 190 about the common axis A with respect to the turbine body 50.

In particular, the tool 250 is configured to engage the notch or notches 245 in order to transmit the rotational force to the threaded tube 190.

Figure 7:
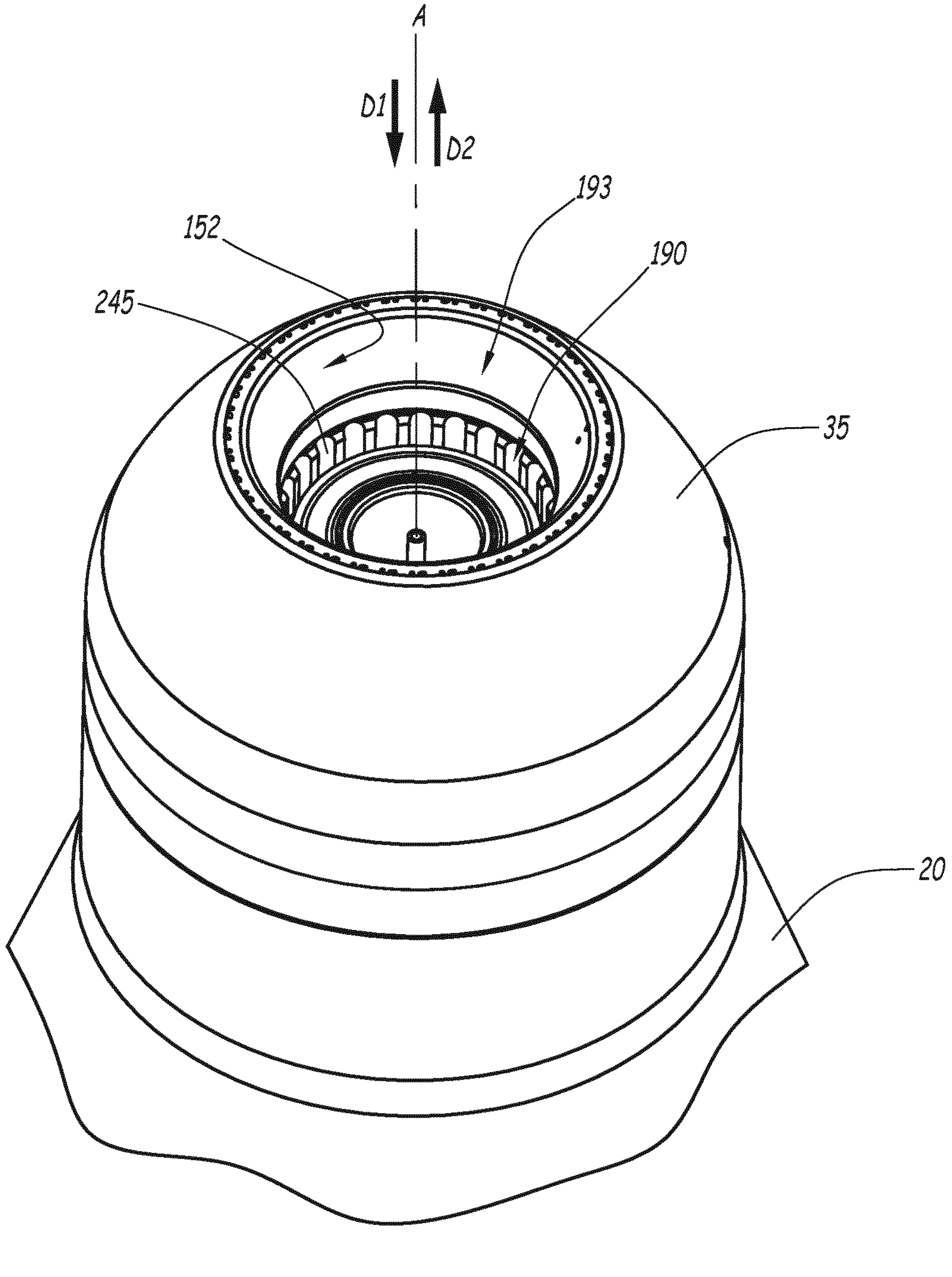
FIG. 7 is a perspective view of the spraying device of FIG. 1.
Figure 8:
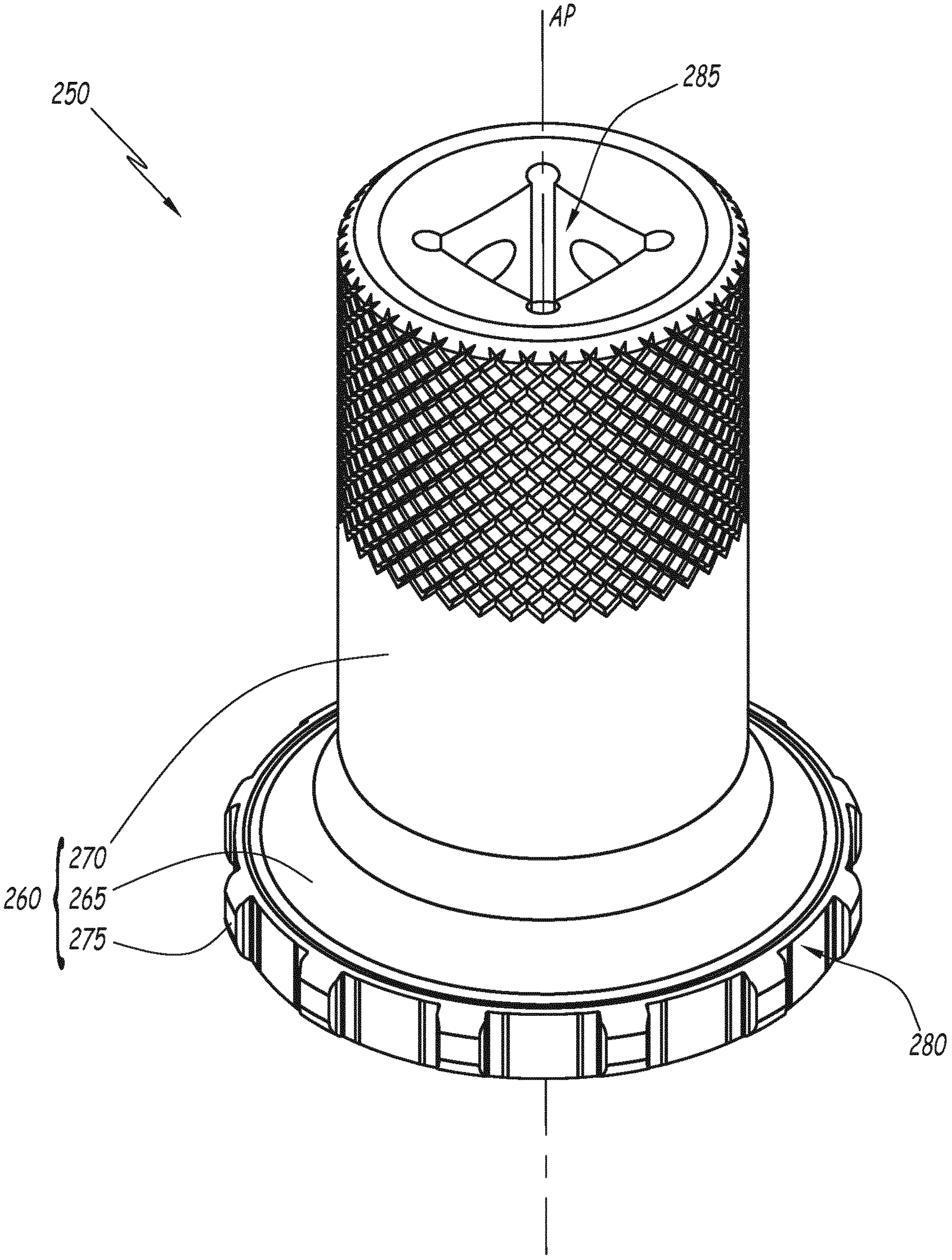
FIG. 8 is a perspective view of a tool provided to pivot the threaded tube of FIG. 5 relative to the turbine body.

The tool 250 comprises a head 260, visible in FIG. 7, and a handle.

The head 260 includes a body 265, a base 270 and a set of protrusions 275.

The head 260 is for example monobloc.

The head extends along a specific axis AP.

The body 265 has an outer face 280 delimiting the body 265 in a plane perpendicular to the specific axis.

The outer face 280 is cylindrical about the specific axis AP. The outer face 280 has a diameter of between 30 mm and 60 mm.

The base 270 is able to allow the handle to be fastened to the head 260. For example, the base 270 extends from the body 265 along the specific axis AP and has an impression 285 able to cooperate with the handle so as to allow the handle to be fastened to the head 260.

Each protrusion 275 extends radially outward from the outer face 280 of the body 265.

Each protrusion 275 is configured to be engaged in a notch 245 in order to rotate the threaded tube 190. In particular, the protrusions 275 are configured to be engaged simultaneously in the notches 245 by a translational movement of the tool 250 along the specific axis AP, the specific axis AP being combined with the common axis A of the spraying device 20.

Each protrusion 275 has a thickness, measured in a plane perpendicular to the specific axis AP, from the outer face 280, of between 0.5 mm and 5 mm.

The handle is provided to be fastened to the head and to rotate the head 260 about the specific axis AP.

According to one embodiment, the handle is able to allow an operator to control a tightening torque transmitted by the tool 250 to the tube 190. For example, the handle is a torque wrench, a head of which is engaged in the impression 285 in order to rotate the head 270 about the specific axis AP.

It should be noted that other types of tools may be considered to rotate the threaded tube 190 relative to the turbine body 50, in particular if the shape of the threaded tube 190 and in particular the shape and/or the number of the notches 245 are modified.

Owing to the use of the threaded tube 190, the skirt 35 is effectively pressed against the first end face 90 by the engagement of the two threads 195 and 240. The skirt 35 is therefore kept in position relative to the turbine body 50 with no tool engaging on the outside of the skirt 35. The spraying device 20 therefore does not assume that notches are arranged on the outer surface of the skirt 35.

On the contrary, the threaded tube 190 is inserted at least partially between the skirt 35 and the bowl 30 and is therefore protected against the depositing of coating products.

The threaded tube 190 therefore allows more reproducible clamping of the skirt 35 against the turbine body 50, and more precise positioning.

The shoulder 225 makes it possible to effectively block the translation of the threaded tube 190 along the common axis A while allowing the rotation about this axis. A turbine body 50 in which the groove 197 for receiving the first section 210 is delimited along the common axis A by two separate parts 50C and 50D of the turbine body 50 makes it possible to easily fasten the tube 190 to the turbine body by placing the first section 210 in the groove 197 of the third part 50C, then by fastening the fourth part 50D to the third part 50C.

When the length of the first section 210 is greater than or equal to 40 mm, the first section 210 prevents any particles generated by the rubbing of the shoulder 225 against the fourth part 50D from being carried by the streams of gas G which are present in the zone between the bowl 30 and the skirt 35.

The non-cylindrical configuration of the inner face 200 of the second section 215 makes it possible to maneuver the tube 190 easily, and in particular to set it in rotation about the common axis A relative to the turbine body 50, from the opening 152 of the skirt 35. The fastening and the separation of the skirt 35 and of the turbine body 50 are therefore simplified.

The notches 245 make it possible to effectively maneuver the threaded tube 190 simply. When they open onto the third end face 237, it is particularly easy to insert the tool 250 by a simple translation along the upstream direction D1.

This is particularly true when the bottom of each notch 245 is further positioned at a distance less than or equal to half of the minimum diameter of the inner face 193 of the skirt 35, since the tool 250 is then inserted through the opening 152 of the skirt 35 in order to insert the protrusions 275 into the notches 245. This configuration in particular allows a simple geometry of the tool 250, visible in FIG. 7. This tool 250 allows a very effective transmission of force, since several protrusions 275 are inserted simultaneously into the notches 245.

It should be noted that the assembly of the skirt 35 onto the turbine body 50 via the threaded tube 190 may be implemented in embodiments where the injector 40 is not assembled directly on the turbine body 50.

The invention claimed is:

1. A turbine for a fluid-spraying device, the fluid-spraying device comprising a bowl, an injector configured to inject fluid in the bottom of the bowl, and a skirt at least partially surrounding the bowl in a plane perpendicular to a common axis of rotation and ejecting jets of gas in order to mold a sprayed fluid, the turbine comprising:

a turbine body comprising a first end face delimiting the turbine body along the common axis of rotation, wherein the turbine body is adapted such that the skirt bears against the first end face;

a threaded tube positioned directly on said turbine body and rotatable about the common axis with respect to said turbine body, the threaded tube comprising a section; and a rotor rotated by a jet of gas, and rotating the bowl relative to said turbine body about the common axis of rotation, wherein said rotor is surrounded by said turbine body in a plane perpendicular to the common axis of rotation, wherein said turbine body guides rotation of said rotor and receives the jet of gas at an outlet of said rotor, and delimits at least one outlet duct that guides a first portion of the received jet of gas into a space delimited in a plane perpendicular to the common axis of rotation by the bowl and the skirt, wherein each outlet duct extends between two ends and opens onto said first end face, and wherein the turbine body and said section of said threaded tube completely surround the at least one outlet duct.

2. The turbine according to claim 1, wherein said turbine body comprises said first end face and a second end face, the two end faces delimiting said turbine body along the common axis of rotation, and wherein the ratio between the gas jet flow rate passing through said second end face and the gas jet flow rate of the first portion of the jet of gas is less than 1/100.

3. The turbine according to claim 1, wherein the turbine at least partially delimits an auxiliary passage that conducts a second portion of the jet of gas from said rotor to the bottom of the bowl.

4. The turbine according to claim 3, wherein said turbine body is arranged so that during operation of the turbine, the ratio of the flow rate of the first portion of the jet of gas to the flow rate of the second portion of the jet of gas is greater than or equal to 2.

5. A fluid-spraying device, comprising:
the bowl of claim 1;
the turbine of claim 1;
the injector of claim 1; and
the skirt of claim 1.

6. The fluid-spraying device according to claim 5, wherein an upstream direction and a downstream direction are defined for the common axis of rotation, said skirt being offset toward the downstream direction relative to the turbine body, wherein the rotor has a first upstream face delimiting the rotor along the common axis of rotation, wherein the turbine body delimits a receiving chamber of the rotor, the receiving chamber comprising a second upstream face delimiting the receiving chamber along the common axis of rotation, the second upstream face facing the first upstream face and being offset along the upstream direction relative to the first upstream face, and wherein an annular groove is centered on the common axis of rotation and is in the second upstream face, the annular groove receiving the jet of gas and transmitting the first portion of the jet of gas to each outlet duct of the turbine body.

7. The fluid-spraying device according to claim 6, wherein the second upstream face comprises, for each outlet duct of the at least one outlet duct, a radial groove extending radially outward from the annular groove and guiding the first portion of the jet of gas from the annular groove to the outlet duct.

8. The fluid-spraying device according to claim 7, wherein the at least one outlet duct comprises two outlet ducts, wherein each radial groove extends from the annular groove along a respective line, and wherein the two respective lines are combined.

9. The fluid-spraying device according to claim 5, at least partially delimiting an auxiliary passage that conducts a second portion of the jet of gas from the rotor to the bottom of said bowl, wherein at least one section of the auxiliary passage is in the turbine body.

10. The fluid-spraying device according to claim 9, wherein said injector is surrounded by the rotor in a plane perpendicular to the common axis of rotation, wherein a free volume separates the rotor and said injector in a plane perpendicular to the common axis of rotation, wherein the auxiliary passage comprises a duct configured to guide the second portion of the jet of gas to the free volume, and wherein the free volume guides the second portion of the stream jet of gas to the bottom of said bowl.

11. A facility, including comprising:
a moving arm; and
a fluid-spraying device according to claim 5, wherein the turbine body of the fluid-spraying device is mounted directly on said arm.

12. The turbine according to claim 3, wherein said turbine body is arranged so that during operation of the turbine, the ratio of the flow rate of the first portion of the jet of gas to the flow rate of the second portion of the jet of gas is greater than or equal to 3.

13. The turbine according to claim 3, wherein said turbine body is arranged so that during operation of the turbine, the ratio of the flow rate of the first portion of the jet of gas to the flow rate of the second portion of the jet of gas is greater than or equal to 10.

14. The turbine according to claim 1, wherein each outlet duct conducts the corresponding first portion into a free space separating the bowl from the skirt.

15. The turbine according to claim 7, wherein each outlet duct opens into the corresponding radial groove.

16. The fluid-spraying device according to claim 5, wherein said injector is received in an opening arranged in the first end face of the body of said turbine, wherein the opening comprises a first bearing face perpendicular to the common axis of rotation, and wherein said injector comprises a second bearing face that bears against said first bearing face.

* * * * *